(12) United States Patent
Watanabe

(10) Patent No.: US 9,968,830 B2
(45) Date of Patent: May 15, 2018

(54) MULTI-PIECE SOLID GOLF BALL

(71) Applicant: Bridgestone Sports Co., Ltd., Tokyo (JP)

(72) Inventor: Hideo Watanabe, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 33 days.

(21) Appl. No.: 14/860,884

(22) Filed: Sep. 22, 2015

(65) Prior Publication Data

US 2016/0151679 A1    Jun. 2, 2016

(30) Foreign Application Priority Data

Nov. 27, 2014    (JP) .................................. 2014-240404

(51) Int. Cl.
  *A63B 37/06*    (2006.01)
  *A63B 37/00*    (2006.01)
  *C08K 5/098*    (2006.01)

(52) U.S. Cl.
  CPC ...... *A63B 37/0092* (2013.01); *A63B 37/0039* (2013.01); *A63B 37/0046* (2013.01); *A63B 37/0051* (2013.01); *A63B 37/0068* (2013.01); *A63B 37/0076* (2013.01); *A63B 37/0077* (2013.01); *A63B 37/0084* (2013.01); *C08K 5/098* (2013.01); *A63B 37/0033* (2013.01); *A63B 37/0045* (2013.01); *A63B 37/0065* (2013.01); *A63B 37/0087* (2013.01)

(58) Field of Classification Search
  CPC ........................ A63B 37/0081; A63B 37/0084
  USPC ....................................................... 473/376
  See application file for complete search history.

(56) References Cited

U.S. PATENT DOCUMENTS

| 8,123,630 B2 | 2/2012 | Watanabe |
| 8,523,707 B2 | 9/2013 | Watanabe et al. |
| 8,771,103 B2 | 7/2014 | Watanabe et al. |

(Continued)

FOREIGN PATENT DOCUMENTS

| JP | 2007-319667 A | 12/2007 |
| JP | 2007-330789 A | 12/2007 |

(Continued)

OTHER PUBLICATIONS

Communication dated Jan. 30, 2018 from the Japanese Patent Office in counterpart Application No. 2014-240404.

*Primary Examiner* — Raeann Gorden
(74) *Attorney, Agent, or Firm* — Sughrue Mion, PLLC

(57) ABSTRACT

In a multi-piece solid golf ball having a core, an envelope layer, an intermediate layer, and a cover with a plurality of dimples formed thereon, the core is formed primarily of a base rubber, the envelope layer and the intermediate layer are formed primarily of synthetic resin materials, and the cover layer is formed primarily of a urethane material. The relationships between, respectively, the surface hardnesses of the envelope layer-encased sphere and the ball, the thicknesses of the intermediate layer and the cover layer, the deflections of the core and the ball, and the initial velocities of the core and various layer-encased spheres of the ball each satisfy specific conditions. This golf ball makes it possible for amateur golfers, while maintaining a good distance on shots with a driver (W#1), to obtain a good ball controllability on approach shots and moreover experience a soft feel at impact.

16 Claims, 1 Drawing Sheet

(56) References Cited

U.S. PATENT DOCUMENTS

| | | | |
|---|---|---|---|
| 2007/0281801 A1* | 12/2007 | Watanabe | A63B 37/0003 473/371 |
| 2010/0190575 A1* | 7/2010 | Umezawa | A63B 37/0004 473/373 |
| 2014/0100059 A1* | 4/2014 | Kimura | A63B 37/0081 473/374 |
| 2014/0194221 A1 | 7/2014 | Watanabe et al. | |
| 2014/0256470 A1 | 9/2014 | Watanabe et al. | |

FOREIGN PATENT DOCUMENTS

| | | |
|---|---|---|
| JP | 2008-68077 A | 3/2008 |
| JP | 2009-95364 A | 5/2009 |
| JP | 2010-253268 A | 11/2010 |
| JP | 2014-132955 A | 7/2014 |

* cited by examiner

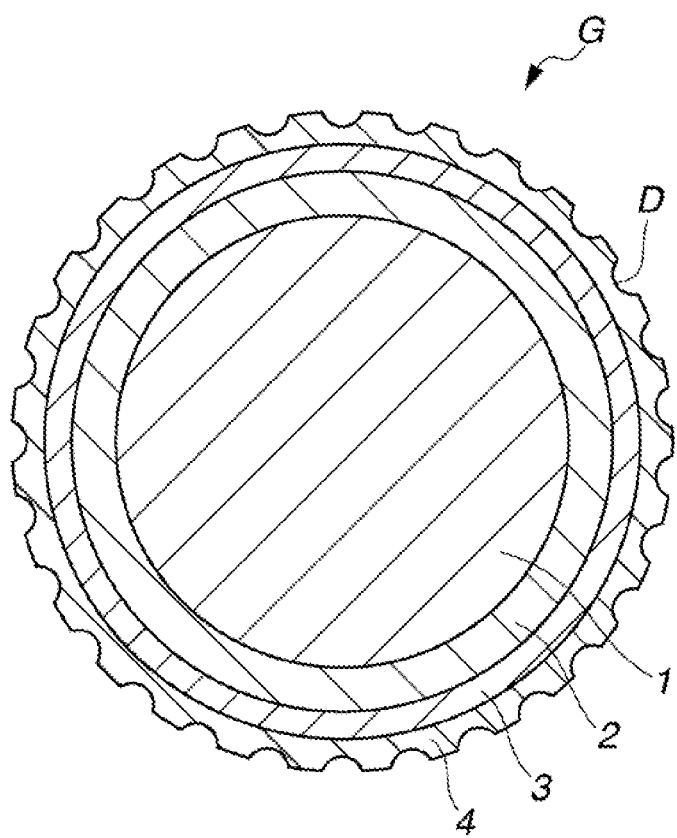

MULTI-PIECE SOLID GOLF BALL

CROSS-REFERENCE TO RELATED APPLICATION

This non-provisional application claims priority under 35 U.S.C. § 119(a) on Patent Application No. 2014-240404 filed in Japan on Nov. 27, 2014, the entire contents of which are hereby incorporated by reference.

BACKGROUND OF THE INVENTION

Field of the Invention

The present invention relates to a multi-piece solid golf ball having at least a four-layer construction that includes a core, an envelope layer, an intermediate layer and a cover layer. The invention relates in particular to a multi-piece solid golf ball capable of giving the ordinary amateur player a competitive edge in a game of golf.

Prior Art

There have hitherto been a number of innovations which, in order to give amateur golfers having head speeds of about 35 to 45 m/s a competitive edge in a game of golf, provide the golf ball with a multilayer construction of four layers.

For example, JP-A 2007-319667 discloses a multi-piece solid golf ball in which the cover layer is formed primarily of urethane, the thicknesses of the individual layers are optimized, and the surface hardnesses of spheres encased by the respective layers are optimized. JP-A 2007-330789 describes a multi-piece solid golf ball formed in such a way that the ball as a whole has a hardness characterized by a hard interior and a soft exterior, and which has an envelope layer formed of a highly neutralized ionomer-based resin material. JP-A 2008-68077 discloses a multi-piece solid golf ball in which the cover layer is formed primarily of urethane, the hardnesses of the individual layers are optimized, and the core hardness profile is optimized. JP-A 2010-253268 describes a golf ball in which the cover layer is formed primarily of an ionomer resin, the intermediate layer and the envelope layer are formed of highly neutralized ionomer-based resin materials, and the core hardness profile is optimized.

However, amateur players today, in order to sharpen their competitive edge in golf games, have an even stronger desire than in the past for a golf ball which achieves at least a given spin rate on approach shots and thus increases controllability and which also has a good, soft feel at impact while maintaining a good distance on shots with a driver (W#1). That is, amateur golfers want a golf ball that both increases the enjoyability of the game and makes them more competitive. The above conventional golf balls leave something to be desired in this respect.

It is therefore an object of this invention to provide a multi-piece solid golf ball which, by having a good controllability on approach shots while maintaining a good distance on shots by amateur golfers with a driver (W#1) and moreover by providing a good, soft feel at impact, is capable of even further increasing the enjoyability of the game.

SUMMARY OF THE INVENTION

We have discovered that, in a golf ball having a core, an envelope layer, an intermediate layer and a cover layer, by forming the core primarily of a base rubber, forming the envelope layer and the intermediate layer primarily of like or unlike synthetic resin materials, and forming the cover layer primarily of a urethane material, and by also setting the relationship between the surface hardnesses of the envelope layer-encased sphere and the ball, the relationship between the thicknesses of the intermediate layer and the cover layer, the relationship between the deflections of the core and the ball when compressed under a specific load, and the relationship between the initial velocities of the core and various layer-encased spheres of the ball such as to satisfy specific conditions, it is possible for amateur golfers, while maintaining a good distance on shots with a driver (W#1), to obtain a good ball controllability on approach shots and moreover experience a soft feel at impact.

Accordingly, the invention provides a multi-piece solid golf ball which has a core, an envelope layer encasing the core, an intermediate layer encasing the envelope layer, and a cover layer encasing the intermediate layer and having formed on an outer surface thereof a plurality of dimples. The core is formed primarily of a base rubber, the envelope layer and the intermediate layer are formed primarily of like or unlike synthetic resin materials, and the cover layer is formed primarily of a urethane material. Moreover, the golf ball satisfies conditions (1) to (4) below:

(1) surface hardness (Shore D) of envelope layer-encased sphere<surface hardness (Shore D) of ball;
(2) cover layer thickness≤intermediate layer thickness;
(3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and
(4) initial velocity (m/s) of core>initial velocity (m/s) of ball.

In a preferred embodiment, the multi-piece solid golf ball of the invention further satisfies conditions (5) to (7) below:

(5) (initial velocity of envelope layer-encased sphere−initial velocity of core)<0 m/s;
(6) [surface hardness (Shore D) of envelope layer-encased sphere−surface hardness (Shore D) of core]>0; and
(7) 0.25 mm≤T−E≤0.6 mm, where E (mm) is the deflection of the envelope layer-encased sphere when compressed under a final load of 1,275 N (130 kgf) from an initial load of 98 N (10 kgf).

In another preferred embodiment, the multi-piece solid golf ball of the invention further satisfies conditions (8) and (9) below:

(8) (initial velocity of intermediate layer-encased sphere−initial velocity of envelope layer-encased sphere)>0 m/s; and
(9) surface hardness (Shore D) of envelope layer-encased sphere<surface hardness (Shore D) of intermediate layer-encased sphere>surface hardness (Shore D) of ball.

In yet another preferred embodiment, the multi-piece solid golf ball of the invention further satisfies conditions (10) and (11) below:

(10) −20≤[surface hardness (Shore D) of ball−surface hardness (Shore D) of intermediate layer-encased sphere]≤−1; and
(11) −2.5 m/s≤(initial velocity of ball−initial velocity of intermediate layer-encased sphere)≤+0.5 m/s.

In a still further embodiment, the multi-piece solid golf ball of the invention further satisfies conditions (12) and (13) below:

(12) −2 m/s≤(initial velocity of ball−initial velocity of envelope layer-encased sphere)≤+1 m/s; and
(13) −10≤[surface hardness (Shore D) of envelope layer-encased sphere−surface hardness (Shore D) of ball]≤+10.

The core of the inventive multi-piece solid golf ball may be formed of a hot-molded product of a rubber composition comprising components (A) to (C) below:
 (A) a base rubber;
 (B) an organic peroxide; and
 (C) water and/or a metal monocarboxylate.

The envelope layer of the inventive multi-piece solid golf ball may be formed of a material obtained by blending as essential components:
100 parts by weight of a resin component composed of, in admixture,
 a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester random copolymer and/or a metal ion neutralization product of an olefin-unsaturated carboxylic acid-unsaturated carboxylic acid ester random copolymer in a weight ratio between 100:0 and 0:100, and
 (e) a non-ionomeric thermoplastic elastomer in a weight ratio between 100:0 and 50:50;
(c) from 5 to 80 parts by weight of a fatty acid and/or fatty acid derivative having a molecular weight of from 228 to 1500; and
(d) from 0.1 to 17 parts by weight of a basic inorganic metal compound capable of neutralizing un-neutralized acid groups in the base resin and component (c).

The intermediate layer of the inventive multi-piece solid golf ball may be formed primarily of a resin mixture of a zinc-neutralized ionomer resin and a sodium-neutralized ionomer resin.

The golf ball of this invention makes it possible for amateur golfers, while maintaining a good distance on shots with a driver (W#1), to obtain a good ball controllability on approach shots and experience a soft feel at impact.

BRIEF DESCRIPTION OF THE DIAGRAMS

FIG. 1 is a schematic cross-sectional diagram showing a golf ball according to one embodiment of the invention.

DETAILED DESCRIPTION OF THE INVENTION

The objects, features and advantages of the invention will become more apparent from the following detailed description, taken in conjunction with the foregoing diagram.

The multi-piece solid golf ball of the invention has, arranged in order from the inside of the golf ball: a core, an envelope layer, an intermediate layer and a cover layer. For example, referring to FIG. 1, a golf ball G has a core 1, an envelope layer 2 which encases the core 1, an intermediate layer 3 which encases the envelope layer 2, and a cover layer 4 which encases the intermediate layer 3. Numerous dimples D are formed on the outer surface of the cover layer 4 in order to improve the aerodynamic properties of the ball. Each of these layers is described in detail below.

The core is formed primarily of a base rubber, and may be formed using a rubber composition that includes, within the base rubber, known compounding ingredients such as co-crosslinking agents, organic peroxides, inert fillers, sulfur, antioxidants and organosulfur compounds.

In the practice of this invention, it is especially preferable to use a rubber composition containing compounding ingredients (A) to (C) shown below:

(A) a base rubber;
 (B) an organic peroxide; and
 (C) water and/or a metal monocarboxylate.

The base rubber serving as component (A) is not particularly limited, although the use of a polybutadiene is especially preferred.

This polybutadiene may be one having a cis-1,4 bond content on the polymer chain of at least 60%, preferably at least 80 wt %, more preferably at least 90 wt %, and most preferably at least 95 wt %. When the content of cis-1,4 bonds among the bonds on the polybutadiene molecule is too low, the resilience may decrease.

A polybutadiene rubber differing from the above polybutadiene may also be included in the base rubber. In addition, styrene-butadiene rubber (SBR), natural rubber, polyisoprene rubber, ethylene-propylene-diene rubber (EPDM) or the like may be included as well. These may be used singly, or two or more may be used in combination.

The organic peroxide (B) used in the invention is not particularly limited, although the use of an organic peroxide having a one-minute half-life temperature of 110 to 185° C. is preferred. One, two or more organic peroxides may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all from NOF Corporation), and Luperco 231XL (from Atochem Co.).

The water serving as component (C) in the invention is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition before vulcanization becomes preferably at least 1,000 ppm, and more preferably at least 1,500 ppm. The upper limit is preferably not more than 8,500 ppm, and more preferably not more than 8,000 ppm. When the water content of the rubber composition is too small, it may be difficult to obtain a suitable crosslink density and tan δ, which may make it difficult to mold a golf ball having little energy loss and a reduced spin rate. On the other hand, when the water content of the rubber composition is too large, the core may be too soft, which may make it difficult to obtain a suitable core initial velocity.

It is also possible to include water directly in the rubber composition. The following methods (i) to (iii) may be employed to include water:
(i) applying steam or ultrasonically applying water in the form of a mist to some or all of the rubber composition (compounded material);
(ii) immersing some or all of the rubber composition in water;
(iii) letting some or all of the rubber composition stand for a fixed period of time in a high-humidity environment in a place where the humidity can be controlled, such as a constant humidity chamber.

As used herein, "high-humidity environment" is not particularly limited, so long as it is an environment capable of moistening the rubber composition, although a humidity of from 40 to 100% is preferred.

Alternatively, the water may be worked into a jelly state and blended into the above rubber composition. Or a material obtained by first supporting water on a filler, unvulcanized rubber, rubber powder or the like may be blended into the rubber composition. In such a form, the workability is better than when water is directly added to the composition, enabling the golf ball production efficiency to be enhanced. The type of material in which a given amount of water has been included, although not particularly limited, is exemplified by fillers, unvulcanized rubbers and rubber powders in which sufficient water has been included. The use of a material which undergoes no loss of durability or resilience is especially preferred. The water content of the above material is preferably at least 3 wt %, more preferably at least 5 wt %, and even more preferably at least 10 wt %. The upper limit is preferably not more than 99 wt %, and even more preferably not more than 95 wt %.

A metal monocarboxylate may be used instead of the water. Metal monocarboxylates, in which the carboxylic acid is presumably coordination-bonded to the metal, are distinct from metal dicarboxylates such as zinc diacrylate of the formula $(CH_2=CHCOO)_2Zn$. A metal monocarboxylate introduces water into the rubber composition by way of a dehydration/condensation reaction, and thus provides an effect similar to that of water. Moreover, because a metal monocarboxylate can be blended into the rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan δ, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

The core in this invention can be obtained by vulcanizing and curing the above rubber composition using a similar method as for known golf ball rubber compositions. The vulcanization conditions may be, for example, a vulcanization temperature of from 100 to 200° C. and a vulcanization time of from 5 to 40 minutes.

It is recommended that the core diameter be preferably at least 34.0 mm, more preferably at least 35.0 mm, and even more preferably at least 36.0 mm, with the upper limit being preferably not more than 38.5 mm, more preferably not more than 37.5 mm, and even more preferably not more than 36.5 mm. At a core diameter smaller than above, a sufficient spin rate-lowering effect and rebound may not be obtained.

On the other hand, at a core diameter larger than above, a sufficient spin rate-lowering effect may not be obtained and it may not be possible to obtain the advantageous effects imparted by the cover.

It is recommended that the deflection of the core when compressed under a final load of 1,275 N (130 kgf) from an initial load of 98 N (10 kgf), although not particularly limited, be preferably at least 2.5 mm, more preferably at least 3.0 mm, and even more preferably at least 3.8 mm. The upper limit is preferably not more than 8.0 mm, more preferably not more than 6.0 mm, and even more preferably not more than 5.0 mm. When the deflection is larger than the above value, the core becomes too soft, which may cause the rebound to be too low, resulting in a poor distance, the feel at impact may be too soft, and the durability to cracking on repeated impact may worsen. On the other hand, when the deflection is smaller than the above value, the core may become too hard, which may cause the spin rate to rise excessively, resulting in a poor distance, or the feel at impact may become too hard.

The core has a center hardness expressed in terms of JIS-C hardness which, although not particularly limited, is preferably at least 50, more preferably at least 55, and even more preferably at least 58, with the upper limit being preferably not more than 65, more preferably not more than 63, and even more preferably not more than 61. At a core center hardness lower than the above range, the durability to cracking on repeated impact may worsen. On the other hand, at a core center hardness which is too high, the spin rate may rise excessively, resulting in a poor distance.

The core has a surface hardness expressed in terms of JIS-C hardness which, although not particularly limited, is preferably at least 70, more preferably at least 75, and even more preferably at least 78, with the upper limit being preferably not more than 95, more preferably not more than 92, and even more preferably not more than 90. When the surface hardness of the core is lower than the above range, the spin rate may rise excessively and the rebound may become lower, as a result of which a sufficient distance may not be obtained. On the other hand, when the surface hardness of the core is higher than the above range, the feel at impact may become too hard and the durability to cracking on repeated impact may worsen.

The hardness at the position midway between the core surface and center, expressed in terms of JIS-C hardness, is preferably at least 60, more preferably at least 63, and even more preferably at least 65, with the upper limit being preferably not more than 80, more preferably not more than 78, and even more preferably not more than 76. Outside of this range, the spin rate may rise, resulting in a poor distance, and the durability to cracking on repeated impact may worsen.

The JIS-C hardness difference obtained by subtracting the core center hardness from the core surface hardness [(surface hardness of core)−(center hardness of core)], although not particularly limited, is preferably at least 15, more preferably at least 18, and even more preferably at least 20, with the upper limit being preferably not more than 40, more preferably not more than 36, and even more preferably not more than 32. When this hardness difference value is too small, the spin rate-lowering effect on shots with a W#1 may be inadequate, resulting in a poor distance. On the other hand, when the hardness difference value is too large, the ball initial velocity when actually struck may be low, resulting in a poor distance, and the durability to cracking on repeated impact may worsen. Here, "center hardness" refers to the hardness measured at the center of a cross-section obtained by cutting the core in half through the center, and "surface hardness" refers to the hardness measured at the surface of the core (spherical surface).

Next, the envelope layer-forming material is described.

The envelope layer-forming material is composed primarily of a synthetic resin material that is like or unlike, i.e., of the same type as or of a different type from, the subsequently described intermediate layer-forming material. The synthetic resin material is not particularly limited, although preferred use can be made of a material containing as the essential component a base resin of, mixed in specific amounts: (a) an olefin-unsaturated carboxylic acid random copolymer and/or a metal ion neutralization product of an olefin-unsaturated carboxylic acid random copolymer, and (b) an olefin-unsaturated carboxylic acid-unsaturated carboxylic acid ester random copolymer and/or a metal ion neutralization product of an olefin-unsaturated carboxylic acid-unsaturated carboxylic acid ester random copolymer. In this invention, by forming at least one envelope layer using this material, the spin rate on shots with a driver (W#1) can be lowered, enabling a longer distance to be obtained. Moreover, because this material is soft and has a high resilience, a comfortable yet crisp feel can be obtained at impact. This material is described in detail below.

Commercially available products may be used as above components (a) and (b). Illustrative examples of the random copolymer in component (a) include Nucrel N1560, Nucrel N1214, Nucrel N1035 and Nucrel AN4221C (all products of DuPont-Mitsui Polychemicals Co., Ltd.), and Escor 5200, Escor 5100 and Escor 5000 (all products of ExxonMobil Chemical). Illustrative examples of the random copolymer in component (b) include Nucrel AN4311, Nucrel AN4318 and Nucrel AN4319 (all products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a) include Himilan 1554, Himilan 1557, Himilan 1601, Himilan 1605, Himilan 1706 and Himilan AM7311 (all products of DuPont-Mitsui Polychemicals Co., Ltd.), Surlyn 7930 (E.I. DuPont de Nemours & Co.), and Iotek 3110 and Iotek 4200 (both products of ExxonMobil Chemical). Illustrative examples of the metal ion neutralization product of the random copolymer in component (b) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Sodium-neutralized ionomer resins that are suitable as the metal ion neutralization product of the random copolymer include Himilan 1605, Himilan 1601 and Himilan 1555.

When preparing the base resin, the weight ratio in which component (a) and component (b) are mixed may be set to generally between 100:0 and 0:100. Also, the proportion of component (b) relative to the combined amount of components (a) and (b) may be set to preferably at least 50 wt %, more preferably at least 75 wt %, and most preferably 100 wt %.

A non-ionomeric thermoplastic elastomer (e) may be included in the base resin so as to enhance even further both the feel of the ball at impact and the ball rebound. Examples of this component (e) include olefin elastomers, styrene elastomers, polyester elastomers, urethane elastomers and polyamide elastomers. In this invention, to further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component (e). Illustrative examples include Dynaron (JSR Corporation) and the polyester elastomer Hytrel (DuPont-Toray Co., Ltd.).

Component (e) may be included in an amount of more than 0. The upper limit in the amount included per 100 parts by weight of the base resin, although not particularly limited, is preferably not more than 100 parts by weight, more preferably not more than 60 parts by weight, even more preferably not more than 50 parts by weight, and most preferably not more than 40 parts by weight. Too much component (e) lowers the compatibility of the mixture, which may result in a substantial decline in the durability of the golf ball.

Next, a fatty acid or fatty acid derivative having a molecular weight of at least 228 but not more than 1500 may be added as component (c) to the base resin. This component (c) has a very low molecular weight compared with the base resin and, by suitably adjusting the melt viscosity of the mixture, helps in particular to improve the flow properties. Moreover, component (c) includes a relatively high content of acid groups (or derivatives thereof), and is capable of suppressing an excessive loss of resilience.

The amount of component (c) included per 100 parts by weight of the resin component obtained by suitably blending above components (a), (b) and (e) may be set to at least 5 parts by weight, preferably at least 10 parts by weight, more preferably at least 15 parts by weight, and even more preferably at least 18 parts by weight. The upper limit in the amount included may be set to not more than 80 parts by weight, preferably not more than 70 parts by weight, more preferably not more than 60 parts by weight, and even more preferably not more than 50 parts by weight. When the amount of component (c) included is too small, the melt viscosity may decrease, lowering the processability. On the other hand, when the amount included is too large, the durability may decrease.

A basic inorganic metal compound capable of neutralizing acid groups in the base resin and component (c) may be added as component (d). By including component (d), the acid groups present on the base resin and component (c) are neutralized. Owing to synergistic effects from the inclusion of these components, the thermal stability of the resin composition increases; at the same time, a good moldability is imparted and the resilience of the molded product can be enhanced.

The amount of component (d) included per 100 parts by weight of the resin component may be set to at least 0.1 part by weight, preferably at least 0.5 part by weight, more preferably at least 1 part by weight, and even more preferably at least 2 parts by weight. The upper limit in the amount included may be set to not more than 17 parts by weight, preferably not more than 15 parts by weight, more preferably not more than 13 parts by weight, and even more preferably not more than 10 parts by weight. Too little component (d) fails to improve thermal stability and resilience, whereas too much may instead lower the heat resistance of the golf ball material owing to the presence of excess basic inorganic metal compound.

By blending specific respective amounts of components (c) and (d) with the resin component, i.e., the base resin containing specific respective amounts of components (a) and (b) in admixture with optional component (e), a material having excellent thermal stability, flow properties and moldability can be obtained, in addition to which the resilience of molding products obtained therefrom can be markedly improved.

It is recommended that the material formulated from specific amounts of the above resin component and components (c) and (d) have a high degree of neutralization (i.e., that the material be highly neutralized). Specifically, it is recommended that at least 50 mol %, preferably at least 60 mol %, more preferably at least 70 mol %, and even more preferably at least 80 mol %, of the acid groups in the material be neutralized. Highly neutralizing the acid groups in the material makes it possible to more reliably suppress the exchange reactions that cause trouble when only a base resin and a fatty acid (or fatty acid derivative) are used as in the above-cited prior art, thus preventing the generation of fatty acid. As a result, the thermal stability is substantially improved and the moldability is good, enabling molded products of much better resilience to be obtained than with prior-art ionomer resins.

Here, "degree of neutralization" refers to the degree of neutralization of acid groups present within the mixture of the base resin and the fatty acid (or fatty acid derivative) serving as component (c), and differs from the degree of neutralization of the ionomer resin itself when an ionomer resin is used as the metal ion neutralization product of a random copolymer in the base resin. On comparing a mixture of the invention having a certain degree of neutralization with an ionomer resin alone having the same degree of neutralization, the material of the invention contains a very large number of metal ions owing to the inclusion of component (d) and thus has a higher density of ionic crosslinks which contribute to improved resilience, making it possible to confer the molded product with an excellent resilience.

Commercially available products may be used as the material forming the envelope layer. Specific examples include those having the trade names HPF 1000, HPF 2000 and HPF AD1027, as well as the experimental material HPF SEP1264-3 (all from E.I. DuPont de Nemours & Co.).

The envelope layer has a material hardness, expressed in terms of Shore D hardness, which is preferably at least 35, more preferably at least 40, and even more preferably at least 45, with the upper limit being preferably not more than 62, more preferably not more than 60, and even more preferably not more than 55. When the material hardness of the envelope layer is too soft, the ball may be too receptive to spin on full shots, resulting in a poor distance. On the other hand, when the material hardness of the envelope layer is too high, the durability to cracking on repeated impact may worsen and the feel of the ball at impact may become too hard.

The envelope layer has a thickness of preferably at least 0.8 mm, more preferably at least 1.0 mm, and even more preferably at least 1.2 mm, with the upper limit being preferably not more than 4.0 mm, more preferably not more than 3.0 mm, and even more preferably not more than 2.0 mm. At an envelope layer thickness outside of this range, the spin rate-lowering effect on shots with a W#1 may be inadequate, as a result of which a sufficient distance may not be obtained.

The sphere obtained by encasing the core with the envelope layer (referred to below as the "envelope layer-encased sphere") has a surface hardness, expressed in terms of JIS-C hardness, which is preferably at least 57, more preferably at least 63, and even more preferably at least 70, with the upper limit being preferably not more than 92, more preferably not more than 89, and even more preferably not more than 83. When the envelope layer-encased sphere is too soft, the ball may be too receptive to spin on full shots, resulting in a poor distance. On the other hand, when the envelope layer-encased sphere is too hard, the durability to cracking on repeated impact may worsen and the feel of the ball at impact may become too hard.

It is desirable for the surface hardness of the envelope layer-encased sphere to be softer than the surface hardness of the intermediate layer-encased sphere. This hardness difference, expressed in terms of Shore D hardness, is preferably from 3 to 20, more preferably from 5 to 18, and even more preferably from 7 to 16. When the surface of the intermediate layer-encased sphere is too soft and falls outside of this range, the rebound may become low or the spin rate may rise excessively, as a result of which a good distance may not be achieved.

It is desirable for the surface of the envelope layer-encased sphere to be not more than 3 Shore D hardness units softer than the core surface. Specifically, the (surface hardness of envelope layer-encased sphere−surface hardness of core) value, expressed in terms of JIS-C hardness, is preferably from −3 to 20, more preferably from 0 to 15, and even more preferably from 1 to 10. This value, in terms of Shore D hardness, is preferably from −2 to 15, more preferably from 0 to 11, and even more preferably from 1 to 8. When this value is too small, the spin rate-lowering effect may be inadequate, as a result of which a good distance may not be achieved. When this value is too large, the feel at impact on full shots may be too hard or the durability to cracking on repeated impact may worsen.

The lower limit of the (initial velocity of envelope layer-encased sphere−initial velocity of core) value is preferably at least −1.0 m/s, more preferably at least −0.5 m/s, and even more preferably at least −0.3 m/s. At values lower that this, the ball may be too receptive to spin on full shots, as a result of which the intended distance may not be obtained.

Letting T (mm) be the deflection of the core when compressed under a final load of 1,275 N (130 kgf) from an initial load of 98 N (10 kgf) and E (mm) be the deflection of the envelope layer-encased sphere when compressed under a final load of 1,275 N (130 kgf) from an initial load of 98 N (10 kgf), the value T−E is preferably from 0.25 to 0.6 mm, more preferably from 0.3 to 0.5 mm, and even more preferably from 0.35 to 0.45 mm. At values smaller than this, the ball may be too receptive to spin on full shots, as a result of which the intended distance may not be obtained. On the other hand, at values larger than this, the durability of the ball to cracking on repeated impact may worsen.

In addition, it is critical that the surface hardness of the envelope layer-encased sphere be smaller than the surface hardness of the ball; that is, the intermediate layer and the cover layer are formed so as to be relatively hard. The (surface hardness of envelope layer-encased sphere−surface hardness of ball) value, expressed in terms of Shore D hardness, is preferably from −10 to −1, more preferably from −8 to −2, and even more preferably from −6 to −3. When the value falls outside of this range, it may not be possible to achieve both the intended distance and a good feel at impact.

Next, the resin material making up the intermediate layer is described.

The intermediate layer-forming material may be a material of the same type as the above-described envelope layer-forming material. Alternatively, in cases where the intermediate layer is formed primarily of a different type of resin material from the envelope layer-forming material described above, it is suitable to use an ionomer resin material. Specific examples include sodium-neutralized ionomer resins such as those available under the trade names Himilan 1605, Himilan 1601 and Surlyn 8120, and zinc-neutralized ionomer resins such as those available under the trade names Himilan 1557 and Himilan 1706. These may be used singly or two or more may be used in combination.

It is especially preferable for the intermediate layer material to be in a form that is composed primarily of, in admixture, a zinc-neutralized ionomer resin and a sodium-neutralized ionomer resin. The compounding ratio thereof, expressed as the weight ratio "zinc-neutralized ionomer resin/sodium-neutralized ionomer resin," is typically from 25/75 to 75/25, preferably from 35/65 to 65/35, and more preferably from 45/55 to 55/45. If the zinc-neutralized ionomer and the sodium-neutralized ionomer are not included within this range, the resilience may be too low, as a result of which the intended distance may not be obtained, in addition to which the durability to cracking on repeated impact at normal temperatures may worsen and the durability to cracking at low (subzero) temperatures may also worsen.

When an ionomer resin is used as the intermediate layer material, the unsaturated carboxylic acid content (acid content) included in the intermediate layer material is generally at least 10 wt %, and preferably at least 15 wt %, with the upper limit being not more than 25 wt %, and more preferably not more than 20 wt %. At a low acid content, the rebound may decrease or the spin rate may increase, resulting in a poor distance. On the other hand, at a high acid content, the processability may decrease and the durability to cracking on repeated impact may worsen.

The intermediate layer has a material hardness which, although not particularly limited, may be set to a Shore D hardness of preferably at least 53, more preferably at least 58, and even more preferably at least 60, with the upper limit being preferably not more than 75, more preferably not more than 70, and even more preferably not more than 67. At a material hardness softer than the above range, the ball may be too receptive to spin on full shots, as a result of which a good distance may not be achieved. On the other hand, at a material hardness harder than the above range, the durability to cracking on repeated impact may worsen, and the feel at impact when actually hit with a putter and on short approaches may become too hard. Also, from the standpoint of lowering the spin rate on shots with a W#1, it is preferable for the intermediate layer to be formed harder than the subsequently described cover layer.

The surface hardness of the sphere encased by the intermediate layer (referred to below as the "intermediate layer-encased sphere"), expressed in terms of Shore D hardness, is preferably at least 60, more preferably at least 64, and even more preferably at least 66, with the upper limit being preferably not more than 80, more preferably not more than 76, and even more preferably not more than 73.

The intermediate layer has a thickness which, although not particularly limited, is preferably at least 0.5 mm, more preferably at least 0.8 mm, and even more preferably at least 1.0 mm, with the upper limit being preferably not more than 2.5 mm, more preferably not more than 2.0 mm, and even more preferably not more than 1.5 mm. At an intermediate layer thickness outside of this range, the spin rate-lowering effect on shots with a W#1 may be inadequate, as a result of which a good distance may not be obtained. Moreover, at an intermediate layer thickness smaller than this range, the durability to cracking on repeated impact may worsen and the low-temperature durability may also worsen. It is desirable for the intermediate layer to be formed so as to be thicker than the subsequently described cover layer.

It is advantageous to abrade the surface of the intermediate layer in order to increase adhesion with the polyurethane used in the subsequently described cover layer. In addition, it is desirable to apply a primer (adhesive) to the surface of the intermediate layer following such abrasion treatment or to add an adhesion reinforcing agent to the intermediate layer material.

The intermediate layer material has a specific gravity which is typically less than 1.1, preferably from 0.90 to 1.05, and more preferably from 0.93 to 0.99. Outside of this range, the rebound becomes small, as a result of which a good distance may not be obtained, or the durability to cracking on repeated impact may worsen.

The (surface hardness of intermediate layer-encased sphere−surface hardness of envelope layer-encased sphere) value, expressed in terms of Shore D hardness, is preferably from 1 to 25, more preferably from 5 to 20, and even more preferably from 8 to 15. When this value falls outside of the above range, the feel at impact may worsen or the durability to cracking on repeated impact may worsen.

In addition, the (initial velocity of intermediate layer-encased sphere−initial velocity of envelope layer-encased sphere) value is preferably larger than 0 m/s, and more preferably at least 0.2 m/s, with the upper limit being preferably not more than 2 m/s, more preferably not more than 1 m/s, and even more preferably not more than 0.8 m/s. If this value is too small, the spin rate-lowering effect on full shots may be inadequate, as a result of which the intended distance may not be obtained. On the other hand, if this value is too large, the durability to cracking on repeated impact may worsen.

Next, the cover layer-forming material is described.

In this invention, for reasons having to do with controllability and scuff resistance, a urethane resin is used to form the cover layer. In particular, from the standpoint of the mass productivity of manufactured golf balls, it is preferable to use a cover layer-forming material composed primarily of a thermoplastic polyurethane, with formation more preferably being carried out using a resin blend composed primarily of (A) a thermoplastic polyurethane and (B) a polyisocyanate compound.

In order to fully elicit the desirable effects of the invention, a necessary and sufficient amount of unreacted isocyanate groups should be present in the cover layer-forming resin material. Specifically, it is recommended that the combined weight of above components (A) and (B) be at least 60%, and more preferably at least 70%, of the weight of the overall cover layer. Components (A) and (B) are described below in detail.

The thermoplastic polyurethane (A) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be advantageously used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, an aliphatic diol having 2 to 12 carbons is preferred, and 1,4-butylene glycol is more preferred, as the chain extender.

Any polyisocyanate compound hitherto employed in the art relating to thermoplastic polyurethanes may be advantageously used without particular limitation as the polyisocyanate compound. For example, use may be made of one, two or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reaction during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (A). Illustrative examples include Pandex T-8295, T-8290, T-8260 and T-8283 (all from DIC Bayer Polymer, Ltd.).

Although not an essential ingredient, a thermoplastic elastomer other than the above thermoplastic polyurethane may be included as component (C) together with the above components (A) and (B). By including this component (C) in the above resin blend, a further improvement in the flowability of the resin blend can be achieved and the properties required of a golf ball cover-forming material, such as resilience and scuff resistance, can be enhanced.

The relative proportions of above components (A), (B) and (C) are not particularly limited. However, to fully elicit the desirable effects of the invention, the weight ratio (A):(B):(C) is preferably from 100:2:50 to 100:50:0, and more preferably from 100:2:50 to 100:30:8.

In addition to the ingredients making up the thermoplastic polyurethane, various additives may be optionally included in the above resin blend. For example, pigments, dispersants, antioxidants, light stabilizers, ultraviolet absorbers and internal mold lubricants may be suitably included.

The cover layer has a material hardness which, although not particularly limited, may be set to a Shore D hardness of preferably at least 48, more preferably at least 50, and even more preferably at least 52, with the upper limit being preferably not more than 63, more preferably not more than 60, and even more preferably not more than 58.

The cover layer-encased sphere, i.e., the ball, has a surface hardness, expressed in terms of Shore D hardness, which is preferably at least 53, more preferably at least 56, and even more preferably at least 58, with the upper limit being preferably not more than 70, more preferably not more than 66, and even more preferably not more than 64. If the ball is softer than this range, the spin rate on shots with a W#1 may increase, as a result of which a good distance may not be achieved. On the other hand, if the ball is harder than this range, the spin rate on approach shots may be inadequate, which may worsen the controllability.

The cover layer has a thickness which, although not particularly limited, is preferably at least 0.2 mm, more preferably at least 0.4 mm, and even more preferably at least 0.6 mm, with the upper limit being preferably not more than 1.5 mm, more preferably not more than 1.2 mm, and even more preferably not more than 1.0 mm. If the cover layer is thicker than this range, the rebound on shots with a W#1 may be inadequate and the spin rate may increase, resulting in a poor distance. On the other hand, if the cover layer is thinner than this range, the scuff resistance may worsen or the ball may not have good spin receptivity on approach shots, as a result of which the controllability may be inadequate.

With regard to the surface hardness of the sphere encased by the cover layer, i.e., the surface hardness of the ball, the (surface hardness of ball−surface hardness of intermediate layer-encased sphere) value, expressed in terms of Shore D hardness, is preferably from −20 to −1, more preferably from −15 to −3, and even more preferably from −10 to −6. When this value is larger than the above range, the ball may not have the required spin receptivity on approach shots, which may result in poor controllability, and the durability to cracking on repeated impact may worsen. When this value is smaller than the above range, the ball may be too receptive to spin on full shots, which may result in a poor distance, and the durability to cracking on repeated impact may worsen.

It is desirable for the cover layer to have a smaller thickness than the intermediate layer. The (cover thickness−intermediate layer thickness) value is preferably from −0.1 to −0.8 mm, and more preferably from −0.2 to −0.5 mm. When this value is larger than the above range, the spin rate-lowering effect on full shots may be inadequate, as a result of which the intended distance may not be obtained. On the other hand, when this value is smaller than the above range, the spin rate on approach shots may be inadequate, resulting in poor controllability, and the scuff resistance may be poor.

It is critical for the relationship between the ball initial velocity and the core initial velocity to be as follows: initial velocity (ms) of core>initial velocity (m/s) of ball. This difference, i.e., the (ball initial velocity−core initial velocity) value, is preferably −0.1 m/s or less, more preferably −0.3 m/s or less, and even more preferably −0.5 m/s or less. When this value falls outside of the above range, the ball may be too receptive to spin on full shots or the rebound when the ball is struck may decrease, as a result of which the intended distance may not be obtained. Measurement of the initial velocities of each of these spheres is carried out with the measurement apparatus and under the measurement conditions described below in the Examples section.

Letting T (mm) be the deflection of the core when compressed under a final load of 1,275 N (130 kgf) from an initial load of 98 N (10 kgf) and M (mm) be the deflection of the ball when compressed under a final load of 1,275 N (130 kgf) from an initial load of 98 N (10 kgf), the value T−M is preferably from 1.0 to 4.0 mm, more preferably from 1.05 to 2.0 mm, and even more preferably from 1.1 to 1.5 mm. At a value smaller than this, the spin receptivity on full shots may be too high, as a result of which the intended distance may not be obtained. On the other hand, at a value larger than this, the initial velocity on full shots may be too low, as a result of which the intended distance may not be obtained.

The relationship between the initial velocity of the ball and the initial velocity of the envelope layer-encased sphere, expressed as the (initial velocity of ball–initial velocity of envelope layer-encased sphere) value, is preferably from −2 to +1 m/s, more preferably from −1.5 to +0.5 m/s, and even more preferably from −1 to 0 m/s. If this value falls outside of the above range, the ball may be too receptive to spin on full shots or the rebound when the ball is struck may decrease, as a result of which the intended distance may not be obtained. Measurement of the initial velocities of each of these spheres is carried out with the measurement apparatus and under the measurement conditions described below in the Examples section.

The relationship between the initial velocity of the ball and the initial velocity of the intermediate layer-encased sphere, expressed as the (initial velocity of ball–initial velocity of intermediate layer-encased sphere) value, is preferably from −2.5 to +0.5 m/s, more preferably from −2 to 0 m/s, and even more preferably from −1.5 to −0.5 m/s. If this value is smaller than the above range, the durability to cracking under repeated impact may worsen or the controllability on approach shots may be inadequate. On the other hand, if this value is larger than the above range, the spin rate on full shots may increase or the initial velocity may become low, as a result of which the intended distance may not be obtained. Measurement of the initial velocities of each of these spheres is carried out with the measurement apparatus and under the measurement conditions described below in the Examples section.

The manufacture of multi-piece solid golf balls in which the above-described core, envelope layer, intermediate layer and cover layer are formed as successive layers may be carried out by a customary method such as a known injection-molding process. For example, a multi-piece golf ball may be obtained by placing a molded and vulcanized product composed primarily of a rubber material as the core in a given injection mold, successively injecting first an envelope layer material then an intermediate layer material over the core to give an intermediate sphere, and subsequently placing the resulting sphere in another injection mold and injection-molding a cover material over the sphere. Alternatively, the intermediate sphere may be encased by a cover layer using a method that involves, for example, enclosing the intermediate sphere within two half-cups that have been pre-molded into hemispherical shapes, and molding under applied heat and pressure.

Numerous dimples may be formed on the outer surface of the cover layer. The number of dimples arranged on the cover surface, although not particularly limited, is preferably at least 280, more preferably at least 300, and even more preferably at least 320, with the upper limit being preferably not more than 360, more preferably not more than 350, and even more preferably not more than 340. If the number of dimples is larger than this range, the ball trajectory becomes lower, as a result of which the distance may decrease. On the other hand, if the number of dimples is too small, the ball trajectory becomes higher, as a result of which a good distance may not be achieved.

The dimple shapes that are used may be of one type or a combination of two or more types selected from among circular shapes, various polygonal shapes, dewdrop shapes and oval shapes. For example, when circular dimples are used, the dimple diameter may be set to at least about 2.5 mm and up to about 6.5 mm, and the dimple depth may be set to at least 0.08 mm and up to about 0.30 mm.

In order to be able to fully manifest the aerodynamic properties, it is desirable for the surface coverage ratio of dimples on the spherical surface of the golf ball, i.e., the ratio SR of the sum of the individual dimple surface areas, each defined by the flat plane circumscribed by the edge of a dimple, with respect to the spherical surface area of the ball were it to have no dimples thereon, to be set to at least 60% and up to 90%. Also, in order to optimize the ball trajectory, it is desirable for the value $V_0$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and up to 0.80. Moreover, it is preferable for the ratio VR of the sum of the spatial volumes of the individual dimples, each formed below the flat plane circumscribed by the edge of a dimple, with respect to the volume of the ball sphere were the ball surface to have no dimples thereon, to be set to at least 0.6% and up to 1.0%.

The multi-piece solid golf ball of the invention can be made to conform to the Rules of Golf for play. Specifically, the inventive ball may be formed to a diameter which is such that the ball does not pass through a ring having an inner diameter of 42.672 mm and is not more than 42.80 mm, and to a weight which is preferably from 45.0 to 45.93 g.

EXAMPLES

The following Examples and Comparative Examples are provided to illustrate the invention, and are not intended to limit the scope thereof.

Examples 1 to 3, Comparative Examples 1 to 7

In each Example, a core was produced by preparing the rubber composition shown in Table 1 below, then molding and vulcanizing under vulcanization conditions of 155° C. and 15 minutes.

TABLE 1

| | | Example | | | Comparative Example | | | | | | |
|---|---|---|---|---|---|---|---|---|---|---|---|
| | (parts by weight) | 1 | 2 | 3 | 1 | 2 | 3 | 4 | 5 | 6 | 7 |
| Core | Polybutadiene A | 80 | 80 | 80 | 80 | 80 | 80 | 80 | 80 | 80 | 80 |
| formulation | Polybutadiene B | 20 | 20 | 20 | 20 | 20 | 20 | 20 | 20 | 20 | 20 |
| | Zinc acrylate | 27 | 25.5 | 24 | 27 | 27 | 27 | 29.5 | 24.5 | 29 | 28.5 |
| | Organic peroxide | 1 | 1 | 1 | 1 | 1 | 1 | 1 | 1 | 1 | 1 |
| | Water | 0.4 | 0.4 | 0.4 | 0.4 | 0.4 | 0.4 | 0.4 | 0.4 | 0.4 | 0.4 |
| | Antioxidant | 0.1 | 0.1 | 0.1 | 0.1 | 0.1 | 0.1 | 0.1 | 0.1 | 0.1 | 0.1 |
| | Barium sulfate | 22.6 | 23.1 | 23.7 | 28.2 | 22.6 | 20.4 | 21.5 | 23.9 | 14.2 | 21.5 |
| | Zinc oxide | 4 | 4 | 4 | 4 | 4 | 4 | 4 | 4 | 4 | 4 |

TABLE 1-continued

|  | (parts by weight) | Example | | | Comparative Example | | | | | | |
|---|---|---|---|---|---|---|---|---|---|---|---|
|  |  | 1 | 2 | 3 | 1 | 2 | 3 | 4 | 5 | 6 | 7 |
|  | Zinc salt of pentachloro-thiophenol | 0.4 | 0.5 | 0.6 | 0.4 | 0.4 | 0.4 | 0.4 | — | 0.3 | 1 |
| Vulcanization conditions | Temperature (° C.) | 155 | 155 | 155 | 155 | 155 | 155 | 155 | 155 | 155 | 155 |
|  | Time (min) | 15 | 15 | 15 | 15 | 15 | 15 | 15 | 15 | 15 | 15 |

Details on the core material are as follows. Numbers in the table indicate parts by weight.

Polybutadiene A: Available under the trade name "BR01" from JSR Corporation

Polybutadiene B: Available under the trade name "BR51" from JSR Corporation

Organic peroxide: Dicumyl peroxide, available under the trade name "Percumyl D" from NOF Corporation Antioxidant: 2,2'-Methylenebis(4-methyl-6-t-butylphenol), available under the trade name "Nocrac NS-6" from Ouchi Shinko Chemical Industry Co., Ltd.

Formation of Envelope Layer, Intermediate Layer and Cover

Next, the resin materials (No. 1 to No. 7) formulated as shown in Table 2 below were successively injection-molded over the cores obtained above to form an envelope layer, an intermediate layer and a cover layer, ultimately giving four-piece solid golf balls. However, Comparative Example 6 is a three-piece solid golf ball without an envelope layer. In the case of resin materials No. 4 to No. 6 in Table 2, the respective starting materials (units: parts by weight) were intimately mixed in a nitrogen atmosphere using a twin-screw extruder to give a cover resin blend in the form of pellets having a length of 3 mm and a diameter of 1 to 2 mm, then injection-molded to form the cover layer.

TABLE 2

| | Resin material (pbw) | | | | | | |
|---|---|---|---|---|---|---|---|
| | No. 1 | No. 2 | No. 3 | No. 4 | No. 5 | No. 6 | No. 7 |
| T-8295 | | | | 75 | 100 | | |
| T-8290 | | | | 25 | | 75 | |
| T-8283 | | | | | | 25 | |
| HPF 1000 | 100 | | | | | | |
| HPF 2000 | | 100 | | | | | |
| Himilan 1706 | | | 35 | | | | |
| Himilan 1557 | | | 15 | | | | 30 |
| Himilan 1605 | | | 50 | | | | |
| Himilan 1855 | | | | | | | 20 |
| AM 7331 | | | | | | | 50 |
| Hytrel 4001 | | | | 11 | 11 | 11 | |
| Titanium oxide | | | | 3.9 | 3.9 | 3.9 | 2.2 |
| Polyethylene wax | | | | 1.2 | 1.2 | 1.2 | |
| Isocyanate compound | | | | 7.5 | 7.5 | 7.5 | |
| Trimethylolpropane | 1.1 | 1.1 | | | | | |
| Magnesium stearate | | | | | | | 1.04 |

Trade names for the principal materials in the table are as follows.

HPF 1000: Available from E.I. DuPont de Nemours & Co. as "HPF™ 1000"

HPF 2000: Available from E.I. DuPont de Nemours & Co. as "HPF™ 2000"

AM 7331: A high-stiffness ionomer available from DuPont-Mitsui Polychemicals Co., Ltd.

Himilan: Ionomers available from DuPont-Mitsui Polychemicals Co., Ltd.

T-8295, T-8290, T-8283: MDI-PTMG type thermoplastic polyurethanes available from DIC Bayer Polymer under the trademark Pandex.

Hytrel: Thermoplastic polyether ester elastomers available from DuPont-Toray Co., Ltd.

Polyethylene wax: Available as "Sanwax 161P" from Sanyo Chemical industries, Ltd.

Isocyanate compound: 4,4'-Diphenylmethane diisocyanate

Although not shown, a common dimple pattern was formed on the cover surface in each of the Working Examples of the invention and the Comparative Examples.

For each of the golf balls obtained, properties such as the thicknesses and material hardnesses of the respective layers, and the initial velocities, deflections and surface hardnesses of various layer-encased spheres were measured by the methods described below. The results are shown in Table 3. In addition, the flight performance, performance on approach shots, feel at impact and scuff resistance of each golf ball were evaluated by the following methods. The results are shown in Table 4. All of the measurements were carried out in a 23° C. environment.

Diameters of Core, Envelope Layer-Encased Sphere and Intermediate Layer-Encased Sphere The diameter at five random places on the surface of a single core, envelope layer-encased sphere or intermediate layer-encased sphere was measured at a temperature of 23.9±1° C. and, using the average of the five measurements as the measured value for a single core, envelope-encased sphere or intermediate layer-encased sphere, the average diameters for five measured cores, five measured envelope layer-encased spheres and five measured intermediate layer-encased spheres were determined.

Ball Diameter

The diameters at five random dimple-free places (lands) on the surface of a ball were measured at a temperature of 23.9±1° C. and, using the average of these measurements as the measured value for a single ball, the average diameter for five measured balls was determined.

Deflections of Core, Envelope-Encased Sphere, Intermediate Layer-Encased Sphere and Ball The core, envelope-encased sphere, intermediate layer-encased sphere or ball was placed on a hard plate, and the amount of deflection when compressed under a final load of 1,275 N (130 kgf) from an initial load of 98 N (10 kgf) was measured for each. The amount of deflection here refers to the measured value obtained after holding the test specimen isothermally at 23.9° C.

Center Hardness of Core (JIS-C Hardness)

The hardness at the center of the cross-section obtained by cutting the core in half through the center was measured. Measurement was carried out with the spring-type durometer (JIS-C model) specified in JIS K 6301-1975.

Surface Hardness of Core (Shore D Hardness and JIS-C Hardness)

Measurements were taken by pressing the durometer indenter perpendicularly against the surface of the spherical core. The Shore D hardness was measured with a type D durometer in accordance with ASTM D2240-95, and the JIS-C hardness was measured with the spring-type durometer (JIS-C model) specified in JIS K 6301-1975.

Surface Hardnesses of Envelope Layer-Encased Sphere, Intermediate Layer-Encased Sphere and Ball (Shore D Hardness)

Measurements were taken by pressing the durometer indenter perpendicularly against the surface of the envelope-encased sphere, the intermediate layer-encased sphere or the ball (cover). The surface hardness of the ball (cover) is the measured value obtained at dimple-free places (lands) on the ball surface. The Shore D hardnesses were measured with a type D durometer in accordance with ASTM D2240-95.

Material Hardnesses of Envelope Layer, Intermediate Layer and Cover Layer (Shore D Hardness)

The resin materials for, respectively, the envelope layer, the intermediate layer and the cover layer were formed into sheets having a thickness of 2 mm and left to stand for at least two weeks, following which the Shore D hardnesses were measured in accordance with ASTM D2240-95.

Initial Velocities

The initial velocities were measured using an initial velocity measuring apparatus of the same type as the USGA drum rotation-type initial velocity instrument approved by the R&A. The cores, envelope layer-encased spheres, intermediate layer-encased spheres and balls (referred to below as "spherical test specimens") were held isothermally in a 23.9±1° C. environment for at least 3 hours, and then tested in a chamber at a room temperature of 23.9±2° C. Each spherical test specimen was hit using a 250-pound (113.4 kg) head (striking mass) at an impact velocity of 143.8 ft/s (43.83 m/s). One dozen spherical test specimens were each hit four times. The time taken for the test specimen to traverse a distance of 6.28 ft (1.91 m) was measured and used to compute the initial velocity (m/s). This cycle was carried out over a period of about 15 minutes.

Flight Performance on Shots with a Driver

A driver (W#1) (TourStage PHYZ driver (2011 model; loft angle, 11.5°), manufactured by Bridgestone Sports Co., Ltd.) was mounted on a golf swing robot, and the distance traveled by the ball when struck at a head speed (HS) of 40 m/s was measured. The flight performance was rated according to the following criteria. In addition, the spin rate of the ball immediately after being similarly struck was measured with an apparatus for measuring the initial conditions.

Good: Total distance was 206.0 m or more
NG: Total distance was less than 206.0 m Performance on Approach Shots A sand wedge (SW) (TourStage PHYZ (2011 model), manufactured by Bridgestone Sports Co., Ltd.) was mounted on a golf swing robot, and the spin rate of the ball when hit at a head speed (HS) of 20 m/s was measured. The performance was rated according to the following criteria. The spin rate was measured by the same method as described above for flight performance evaluation.

Good: Spin rate was 5,000 rpm or more
NG: Spin rate was less than 5,000 rpm

Feel

The balls were hit with a driver (W#1) by amateur golfers having head speeds of 35 to 45 m/s, and sensory evaluations were carried out under the following criteria.

Good: Six or more out of ten golfers rated the feel as good
NG: Four or fewer out of ten golfers rated the feel as good Here, a "good feel" refers to a feel at impact that is solid and leads one to believe that the ball will travel far, with a feel that is too soft or too hard being a poor feel.

Scuff Resistance

A non-plated pitching sand wedge was set in a swing robot, and the ball was hit once at a head speed of 40 m/s, following which the surface state of the ball was visually examined and rated as follows.

Good: Can be used again
NG: Cannot be used again

TABLE 3

| | | Example | | | Comparative Example | | | | | | |
|---|---|---|---|---|---|---|---|---|---|---|---|
| | | 1 | 2 | 3 | 1 | 2 | 3 | 4 | 5 | 6 | 7 |
| | Construction | 4 layers | 4 layers | 4 layers | 4 layers | 4 layers | 4 layers | 4 layers | 4 layers | 3 layers | 4 layers |
| Core | Diameter (mm) | 36.3 | 36.3 | 36.3 | 36.3 | 36.3 | 36.3 | 36.3 | 36.3 | 38.9 | 36.3 |
| | Weight (g) | 29.8 | 29.8 | 29.8 | 30.6 | 29.8 | 29.5 | 29.8 | 29.8 | 35.4 | 29.8 |
| | Specific gravity | 1.19 | 1.19 | 1.19 | 1.22 | 1.19 | 1.18 | 1.2 | 1.19 | 1.15 | 1.19 |
| | Deflection (mm) | 4.1 | 4.4 | 4.7 | 4.1 | 4.1 | 4.1 | 3.6 | 4.1 | 3.7 | 4.1 |
| | Initial velocity (m/s) | 77.9 | 77.9 | 77.9 | 77.7 | 77.9 | 78.1 | 77.6 | 76.8 | 77.7 | 78.3 |
| | Surface hardness (Cs), JIS-C | 83 | 80 | 79 | 83 | 83 | 83 | 87 | 83 | 87 | 83 |
| | Center hardness (Cc), JIS-C | 60 | 60 | 59 | 60 | 60 | 60 | 61 | 60 | 61 | 60 |
| | Surface − Center (Cs − Cc) | 23 | 20 | 20 | 23 | 23 | 23 | 26 | 23 | 26 | 23 |
| | Surface hardness (Ds), Shore D | 55 | 53 | 52 | 55 | 55 | 55 | 58 | 55 | 58 | 55 |
| Envelope layer | Type of material | No. 1 | No. 1 | No. 1 | No. 1 | No. 1 | No. 1 | No. 1 | No. 1 | — | No. 1 |
| | Thickness (mm) | 1.3 | 1.3 | 1.3 | 1.3 | 1.3 | 1.3 | 1.3 | 1.3 | — | 1.3 |
| | Specific gravity | 0.96 | 0.96 | 0.96 | 0.96 | 0.96 | 0.96 | 0.96 | 0.96 | — | 0.96 |
| | Material hardness (Shore D) | 50 | 50 | 50 | 50 | 50 | 50 | 50 | 50 | — | 50 |
| Envelope layer-encased sphere | Diameter (mm) | 38.9 | 38.9 | 38.9 | 38.9 | 38.9 | 38.9 | 38.9 | 38.9 | — | 38.9 |
| | Weight (g) | 35.4 | 35.4 | 35.4 | 36.1 | 35.4 | 35.1 | 35.1 | 35.4 | — | 35.4 |
| | Deflection (mm) | 3.72 | 3.99 | 4.27 | 3.72 | 3.72 | 3.72 | 3.3 | 3.72 | — | 3.72 |
| | Initial velocity (m/s) | 77.7 | 77.7 | 77.7 | 77.5 | 77.7 | 77.8 | 77.6 | 76.8 | — | 78.1 |
| | Surface hardness (Es), Shore D | 56 | 56 | 56 | 56 | 56 | 56 | 56 | 56 | — | 56 |
| Envelope layer-encased sphere surface hardness (Es) − Core surface hardness (Ds) | | 1 | 3 | 4 | 1 | 1 | 1 | −2 | 1 | — | 1 |
| Envelope layer-encased sphere initial velocity − Core initial velocity (m/s) | | −0.2 | −0.2 | −0.2 | −0.2 | −0.2 | −0.3 | 0 | 0 | — | −0.2 |
| Core deflection − Envelope layer-encased sphere deflection (mm) | | 0.38 | 0.41 | 0.43 | 0.38 | 0.38 | 0.38 | 0.30 | 0.38 | — | 0.38 |

TABLE 3-continued

|  |  | Example | | | Comparative Example | | | | | | |
|---|---|---|---|---|---|---|---|---|---|---|---|
|  |  | 1 | 2 | 3 | 1 | 2 | 3 | 4 | 5 | 6 | 7 |
| Intermediate layer | Type of material | No. 3 | No. 3 | No. 3 | No. 3 | No. 3 | No. 3 | No. 3 | No. 3 | No. 3 | No. 2 |
|  | Thickness (mm) | 1.08 | 1.08 | 1.08 | 1.08 | 1.08 | 0.80 | 0.80 | 1.08 | 1.08 | 1.08 |
|  | Specific gravity | 0.95 | 0.95 | 0.95 | 0.95 | 0.95 | 0.95 | 0.95 | 0.95 | 0.95 | 0.96 |
|  | Material hardness (Shore D) | 62 | 62 | 62 | 62 | 62 | 62 | 62 | 62 | 62 | 46 |
| Intermediate layer-encased sphere | Diameter (mm) | 41.05 | 41.05 | 41.05 | 41.05 | 41.05 | 40.5 | 40.5 | 41.05 | 41.05 | 41.05 |
|  | Weight (g) | 40.5 | 40.5 | 40.5 | 41.3 | 40.5 | 38.85 | 38.85 | 40.5 | 40.5 | 40.55 |
|  | Deflection (mm) | 3.29 | 3.53 | 3.77 | 3.29 | 3.29 | 3.29 | 2.9 | 3.29 | 3.29 | 3.52 |
|  | Initial velocity (m/s) | 78.2 | 78.2 | 78.2 | 78 | 78.2 | 78.2 | 78.1 | 77.5 | 78.2 | 77.9 |
|  | Surface hardness (Ms), Shore D | 68 | 68 | 68 | 68 | 68 | 68 | 68 | 68 | 68 | 52 |
| Intermediate layer-encased sphere surface hardness (Ms) − Envelope layer-encased sphere surface hardness (Es) |  | 12 | 12 | 12 | 12 | 12 | 12 | 12 | 12 | — | −4 |
| Intermediate layer-encased sphere initial velocity − Envelope layer-encased sphere initial velocity (m/s) |  | 0.5 | 0.5 | 0.5 | 0.5 | 0.5 | 0.4 | 0.5 | 0.7 | — | −0.2 |
| Cover layer | Type of material | No. 4 | No. 4 | No. 5 | No. 7 | No. 6 | No. 4 | No. 4 | No. 4 | No. 4 | No. 4 |
|  | Thickness (mm) | 0.8 | 0.8 | 0.8 | 0.8 | 0.8 | 1.1 | 1.1 | 0.8 | 0.8 | 0.8 |
|  | Specific gravity | 1.15 | 1.15 | 1.15 | 0.97 | 1.15 | 1.15 | 1.15 | 1.15 | 1.15 | 1.15 |
|  | Material hardness (Shore D) | 53 | 53 | 56 | 53 | 47 | 53 | 53 | 53 | 53 | 53 |
| Ball | Diameter (mm) | 42.7 | 42.7 | 42.7 | 42.7 | 42.7 | 42.7 | 42.7 | 42.7 | 42.7 | 42.7 |
|  | Weight (g) | 45.5 | 45.5 | 45.5 | 45.5 | 45.5 | 45.5 | 45.5 | 45.5 | 45.5 | 45.55 |
|  | Deflection (mm) | 2.9 | 3.1 | 3.3 | 2.9 | 3.0 | 2.9 | 2.6 | 2.9 | 2.9 | 3.1 |
|  | Initial velocity (m/s) | 77.3 | 77.3 | 77.3 | 77.3 | 77.3 | 77 | 77.3 | 76.8 | 77.3 | 77 |
|  | Surface hardness (Bs), Shore D | 59 | 59 | 61 | 59 | 53 | 59 | 59 | 59 | 59 | 59 |
| Envelope layer-encased sphere surface hardness − Ball surface hardness |  | −3 | −3 | −5 | −3 | 3 | −3 | −3 | −3 | — | −3 |
| Ball surface hardness (Bs) − Intermediate layer-encased sphere surface hardness (Es) |  | −9 | −9 | −7 | −9 | −15 | −9 | −9 | −9 | −9 | 7 |
| Cover thickness − Intermediate layer thickness (mm) |  | −0.2 | −0.2 | −0.2 | −0.2 | −0.2 | 0.3 | 0.3 | −0.2 | −0.3 | −0.2 |
| Ball initial velocity − Core initial velocity (m/s) |  | −0.6 | −0.6 | −0.6 | −0.4 | −0.6 | −1.1 | −0.3 | 0 | −0.4 | −1.3 |
| Core deflection − Ball deflection (mm) |  | 1.2 | 1.3 | 1.4 | 1.2 | 1.1 | 1.2 | 1.0 | 1.2 | 0.8 | 1.0 |
| Ball initial velocity − Envelope layer-encased sphere initial velocity (m/s) |  | −0.4 | −0.4 | −0.4 | −0.2 | −0.4 | −0.8 | −0.3 | 0 | — | −1.1 |
| Ball initial velocity − Intermediate layer-encased sphere initial velocity (m/s) |  | −0.9 | −0.9 | −0.9 | −0.7 | −0.9 | −1.2 | −0.8 | −0.7 | −0.9 | −0.9 |

TABLE 4

|  |  | Example | | | Comparative Example | | | | | | |
|---|---|---|---|---|---|---|---|---|---|---|---|
|  |  | 1 | 2 | 3 | 1 | 2 | 3 | 4 | 5 | 6 | 7 |
| Flight performance (W#1) | Spin rate (rpm) | 3,333 | 3,192 | 3,051 | 3,329 | 3,532 | 3,413 | 3,513 | 3,355 | 3,401 | 3,477 |
|  | Total distance (m) | 206.9 | 208.1 | 209.0 | 206.8 | 203.0 | 205.3 | 203.6 | 204.5 | 205.5 | 203.0 |
|  | Rating | good | good | good | good | NG | NG | NG | NG | NG | NG |
| Approach shots | Spin rate (rpm) | good | good | good | good | good | good | good | good | good | good |
| Feel | Rating | good | good | good | good | good | good | NG | good | good | good |
| Scuff resistance | Rating | good | good | good | NG | good | good | good | good | good | good |

As is apparent from the results in Table 4, the golf balls of Comparative Examples 1 to 7 were inferior in the following respects to golf balls according to the invention (Working Examples).

In Comparative Example 1, the cover layer was formed of an ionomer. This ball had a poor scuff resistance.

In Comparative Example 2, the surface hardness of the ball was lower than the surface hardness of the envelope layer. The spin rate on shots with a driver (W#1) rose, as a result of which a good distance was not obtained.

Comparative Example 3 was a golf ball having a four-layer construction in which the cover layer was thicker than the intermediate layer. The spin rate on shots with a driver (W#1) was high, as a result of which a good distance was not obtained.

Comparative Example 4 was a golf ball having a four-layer construction in which the (core deflection−ball deflection) value, i.e., the T−M value, was 1.0 mm. The spin rate on shots with a driver (W#1) rose, as a result of which a good distance was not obtained.

Comparative Example 5 was a golf ball which has a four-layer construction and for which the initial velocity of the core is the same as the initial velocity of the ball. The initial velocity of the ball was low, as a result of which a good distance was not obtained.

Comparative Example 6 was a three-piece solid golf ball which lacks an envelope layer. The spin rate on shots with a driver (W#1) rose, as a result of which a good distance was not obtained.

Comparative Example 7 was a four-piece golf ball in which the surface hardness of the intermediate layer-encased sphere is softer than the surface hardness of the envelope layer-encased sphere and the surface hardness of the ball. The spin rate on shots with a driver (W#1) rose, as a result of which a good distance was not obtained.

Japanese Patent Application No. 2014-240404 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer encasing the core, an intermediate layer encasing the envelope layer, and a cover layer encasing the intermediate layer and having formed on an outer surface thereof a plurality of dimples,
   wherein the core is formed primarily of a base rubber, the envelope layer and the intermediate layer are formed primarily of like or unlike synthetic resin materials, the cover layer is formed primarily of a urethane material, and conditions (1) to (4) below are satisfied:
   (1) surface hardness (Shore D) of envelope layer-encased sphere<surface hardness (Shore D) of ball;
   (2) cover layer thickness≤intermediate layer thickness;
   (3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and
   (4) initial velocity (m/s) of core>initial velocity (m/s) of ball; and
   wherein the conditions below are satisfied:
   (initial velocity of intermediate layer-encased sphere−initial velocity of envelope layer-encased sphere)>0 m/s; and
   surface hardness (Shore D) of envelope layer-encased sphere<surface hardness (Shore D) of intermediate layer-encased sphere>surface hardness (Shore D) of ball.

2. The multi-piece solid golf ball of claim 1 which further satisfies conditions (5) to (7) below:
   (5) (initial velocity of envelope layer-encased sphere−initial velocity of core)<0 m/s;
   (6) [surface hardness (Shore D) of envelope layer-encased sphere−surface hardness (Shore D) of core]>0; and
   (7) 0.25≤mm T−≤E 0.6 mm, where E (mm) is the deflection of the envelope layer-encased sphere when compressed under a final load of 1,275 N (130 kgf) from an initial load of 98 N (10 kgf).

3. The multi-piece solid golf ball of claim 1 which further satisfies conditions (10) and (11) below:
   (10) −20≤[surface hardness (Shore D) of ball−surface hardness (Shore D) of intermediate layer-encased sphere]≤−1; and
   (11) −2.5 m/s≤(initial velocity of ball−initial velocity of intermediate layer-encased sphere)≤+0.5 m/s.

4. The multi-piece solid golf ball of claim 1 which further satisfies conditions (12) and (13) below:
   (12) −2 m/s≤(initial velocity of ball−initial velocity of envelope layer-encased sphere)≤+1 m/s; and
   (13) −10≤[surface hardness (Shore D) of envelope layer-encased sphere−surface hardness (Shore D) of ball]≤+10.

5. A multi-piece solid golf ball comprising a core, an envelope layer encasing the core, an intermediate layer encasing the envelope layer, and a cover layer encasing the intermediate layer and having formed on an outer surface thereof a plurality of dimples,
   wherein the core is formed primarily of a base rubber, the envelope layer and the intermediate layer are formed primarily of like or unlike synthetic resin materials, the cover layer is formed primarily of a urethane material, and conditions (1) to (4) below are satisfied:
   (1) surface hardness (Shore D) of envelope layer-encased sphere<surface hardness (Shore D) of ball;
   (2) cover layer thickness≤intermediate layer thickness;
   (3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and
   (4) initial velocity (m/s) of core>initial velocity (m/s) of ball; and
   wherein the core is formed of a hot-molded product of a rubber composition comprising components (A) to (C) below:
   (A) a base rubber;
   (B) an organic peroxide; and
   (C) water and/or a metal monocarboxylate; and
   wherein the multi-piece solid golf ball further satisfies conditions (5) to (7) below:
   (5) (initial velocity of envelope layer-encased sphere−initial velocity of core)<0 m/s;
   (6) [surface hardness (Shore D) of envelope layer-encased sphere−surface hardness (Shore D) of core]>0; and
   (7) 0.25≤mm T−≤E 0.6 mm, where E (mm) is the deflection of the envelope layer-encased sphere when compressed under a final load of 1275 N (130 kgf) from an initial load of 98 N (10 kgf).

6. The multi-piece solid golf ball of claim 1, wherein the envelope layer is formed of a material obtained by blending as essential components:
   100 parts by weight of a resin component composed of, in admixture,
      a base resin of (a) an olefin-unsaturated carboxylic acid random copolymer and/or a metal ion neutralization product of an olefin-unsaturated carboxylic acid random copolymer mixed with (b) an olefin-unsaturated carboxylic acid-unsaturated carboxylic acid ester random copolymer and/or a metal ion neutralization product of an olefin-unsaturated carboxylic acid-unsaturated carboxylic acid ester random copolymer in a weight ratio between 100:0 and 0:100, and
      (e) a non-ionomeric thermoplastic elastomer
   in a weight ratio between 100:0 and 50:50;
   (c) from 5 to 80 parts by weight of a fatty acid and/or fatty acid derivative having a molecular weight of from 228 to 1500; and
   (d) from 0.1 to 17 parts by weight of a basic inorganic metal compound capable of neutralizing un-neutralized acid groups in the base resin and component (c).

7. The multi-piece solid golf ball of claim 1, wherein the intermediate layer is formed primarily of a resin mixture of a zinc-neutralized ionomer resin and a sodium-neutralized ionomer resin.

8. The multi-piece solid golf ball of claim 5 which further satisfies conditions (8) and (9) below:
   (8) (initial velocity of intermediate layer-encased sphere−initial velocity of envelope layer-encased sphere)>0 m/s; and
   (9) surface hardness (Shore D) of envelope layer-encased sphere<surface hardness (Shore D) of intermediate layer-encased sphere>surface hardness (Shore D) of ball.

9. The multi-piece solid golf ball of claim 5 which further satisfies conditions (10) and (11) below:
   (10) −20≤[surface hardness (Shore D) of ball−surface hardness (Shore D) of intermediate layer-encased sphere]≤−1; and
   (11) −2.5 m/s≤(initial velocity of ball−initial velocity of intermediate layer-encased sphere)≤+0.5 m/s.

10. The multi-piece solid golf ball of claim 5 which further satisfies conditions (12) and (13) below:
    (12) −2 m/s≤(initial velocity of ball−initial velocity of envelope layer-encased sphere)≤+1 m/s; and
    (13) −10≤[surface hardness (Shore D) of envelope layer-encased sphere−surface hardness (Shore D) of ball]≤+10.

11. A multi-piece solid golf ball comprising a core, an envelope layer encasing the core, an intermediate layer encasing the envelope layer, and a cover layer encasing the intermediate layer and having formed on an outer surface thereof a plurality of dimples,
    wherein the core is formed primarily of a base rubber, the envelope layer and the intermediate layer are formed primarily of like or unlike synthetic resin materials, the cover layer is formed primarily of a urethane material, and conditions (1) to (4) below are satisfied:
    (1) surface hardness (Shore D) of envelope layer-encased sphere<surface hardness (Shore D) of ball;
    (2) cover layer thickness≤intermediate layer thickness;
    (3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and
    (4) initial velocity (m/s) of core>initial velocity (m/s) of ball; and
    wherein the core is formed of a hot-molded product of a rubber composition comprising components (A) to (C) below:
    (A) a base rubber;
    (B) an organic peroxide; and
    (C) water and/or a metal monocarboxylate; and
    wherein the multi-piece solid golf ball further satisfies conditions (8) and (9) below:
    (8) (initial velocity of intermediate layer-encased sphere−initial velocity of envelope layer-encased sphere)>0 m/s; and
    (9) surface hardness (Shore D) of envelope layer-encased sphere<surface hardness (Shore D) of intermediate layer-encased sphere>surface hardness (Shore D) of ball.

12. The multi-piece solid golf ball of claim 11 which further satisfies conditions (10) and (11) below:
    (10) −20≤[surface hardness (Shore D) of ball−surface hardness (Shore D) of intermediate layer-encased sphere]≤−1; and
    (11) −2.5 m/s≤(initial velocity of ball−initial velocity of intermediate layer-encased sphere)≤+0.5 m/s.

13. The multi-piece solid golf ball of claim 11 which further satisfies conditions (12) and (13) below:
    (12) −2 m/s≤(initial velocity of ball−initial velocity of envelope layer-encased sphere)≤+1 m/s; and
    (13) −10≤[surface hardness (Shore D) of envelope layer-encased sphere−surface hardness (Shore D) of ball]≤+10.

14. A multi-piece solid golf ball comprising a core, an envelope layer encasing the core, an intermediate layer encasing the envelope layer, and a cover layer encasing the intermediate layer and having formed on an outer surface thereof a plurality of dimples,
    wherein the core is formed primarily of a base rubber, the envelope layer and the intermediate layer are formed primarily of like or unlike synthetic resin materials, the cover layer is formed primarily of a urethane material, and conditions (1) to (4) below are satisfied:
    (1) surface hardness (Shore D) of envelope layer-encased sphere<surface hardness (Shore D) of ball;
    (2) cover layer thickness≤intermediate layer thickness;
    (3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and
    (4) initial velocity (m/s) of core>initial velocity (m/s) of ball; and
    wherein the core is formed of a hot-molded product of a rubber composition comprising components (A) to (C) below:
    (A) a base rubber;
    (B) an organic peroxide; and
    (C) water and/or a metal monocarboxylate; and
    wherein the multi-piece solid golf ball further satisfies conditions (10) and (11) below:
    (10) −20≤[surface hardness (Shore D) of ball−surface hardness (Shore D) of intermediate layer-encased sphere]≤−1; and
    (11) −2.5 m/s≤(initial velocity of ball−initial velocity of intermediate layer-encased sphere)≤+0.5 m/s.

15. The multi-piece solid golf ball of claim 14 which further satisfies conditions (12) and (13) below:
    (12) −2 m/s≤(initial velocity of ball−initial velocity of envelope layer-encased sphere)≤+1 m/s; and
    (13) −10≤[surface hardness (Shore D) of envelope layer-encased sphere−surface hardness (Shore D) of ball]≤+10.

16. A multi-piece solid golf ball comprising a core, an envelope layer encasing the core, an intermediate layer encasing the envelope layer, and a cover layer encasing the intermediate layer and having formed on an outer surface thereof a plurality of dimples,
    wherein the core is formed primarily of a base rubber, the envelope layer and the intermediate layer are formed primarily of like or unlike synthetic resin materials, the cover layer is formed primarily of a urethane material, and conditions (1) to (4) below are satisfied:
    (1) surface hardness (Shore D) of envelope layer-encased sphere<surface hardness (Shore D) of ball;
    (2) cover layer thickness≤intermediate layer thickness;

(3) T−M>1.0 mm, where T (mm) is the deflection of the core when compressed under a final load of 1,275 N (130 kgf) from an initial load of 98 N (10 kgf) and M (mm) is the deflection of the ball when compressed under a final load of 1,275 N (130 kgf) from an initial load of 98 N (10 kgf); and (4) initial velocity (m/s) of core>initial velocity (m/s) of ball; and wherein the core is formed of a hot-molded product of a rubber composition comprising components (A) to (C) below:
 (A) a base rubber;
 (B) an organic peroxide; and
 (C) water and/or a metal monocarboxylate; and wherein the multi-piece solid golf ball further satisfies conditions (12) and (13) below:

(12) −2 m/s≤(initial velocity of ball−initial velocity of envelope layer-encased sphere)≤+1 m/s; and

(13) −10≤[surface hardness (Shore D) of envelope layer-encased sphere−surface hardness (Shore D) of ball]≤+10.

* * * * *